(12) United States Patent
Guo

(10) Patent No.: US 11,714,128 B2
(45) Date of Patent: Aug. 1, 2023

(54) METHOD AND APPARATUS FOR TESTING ARTIFICIAL INTELLIGENCE CHIP, DEVICE AND STORAGE MEDIUM

(71) Applicant: KUNLUNXIN TECHNOLOGY (BEIJING) COMPANY LIMITED, Beijing (CN)

(72) Inventor: Ziyu Guo, Beijing (CN)

(73) Assignee: KUNLUNXIN TECHNOLOGY (BEIJING) COMPANY LIMITED

( * ) Notice: Subject to any disclaimer, the term of this patent is extended or adjusted under 35 U.S.C. 154(b) by 105 days.

(21) Appl. No.: 17/021,080

(22) Filed: Sep. 15, 2020

(65) Prior Publication Data

US 2021/0223311 A1 Jul. 22, 2021

(30) Foreign Application Priority Data

Dec. 31, 2019 (CN) .......................... 201911420462.8

(51) Int. Cl.
*G01R 31/3177* (2006.01)
*G06N 5/02* (2023.01)
(Continued)

(52) U.S. Cl.
CPC ........... *G01R 31/3177* (2013.01); *G06N 5/02* (2013.01); *G01R 31/3193* (2013.01);
(Continued)

(58) Field of Classification Search
CPC .......... G01R 31/3177; G01R 31/31704; G01R 31/31932; G01R 31/318519;
(Continued)

(56) References Cited

U.S. PATENT DOCUMENTS 5,822,557 A 10/1998 Suetake et al.
2007/0136732 A1 6/2007 Saitoh et al.
(Continued)

FOREIGN PATENT DOCUMENTS

CN 101751317 B 11/2013
CN 105138440 A 12/2015
(Continued)

OTHER PUBLICATIONS

First Office Action in CN Patent Application No. 201911420462.8 dated Feb. 18, 2021.
(Continued)

*Primary Examiner* — April Y Blair
*Assistant Examiner* — Sazzad Hossain
(74) *Attorney, Agent, or Firm* — Dilworth IP, LLC

(57) ABSTRACT

The present disclosure discloses a method and an apparatus for testing an artificial intelligence chip test, a device and a storage medium, and relates to the field of artificial intelligence. The specific implementation solution is: the target artificial intelligence chip has multiple same arithmetic units, the method includes: obtaining scale information of the target artificial intelligence chip; determining whether the target artificial intelligence chip satisfies a test condition of an arithmetic unit array level according to the scale information; dividing all the arithmetic units into multiple same arithmetic unit arrays, and performing a DFT test on the arithmetic unit arrays, respectively, if it is determined that the test condition of the arithmetic unit array level is satisfied; performing the DFT test on the arithmetic units, respectively, if it is not determined that the test condition of the arithmetic unit array level is not satisfied.

17 Claims, 9 Drawing Sheets

(51) Int. Cl.
    *G01R 31/3185* (2006.01)
    *G01R 31/317* (2006.01)
    *G06F 115/08* (2020.01)
    *G06F 11/22* (2006.01)
    *G01R 31/3193* (2006.01)
    *G01R 31/319* (2006.01)

(52) U.S. Cl.
    CPC .. *G01R 31/31701* (2013.01); *G01R 31/31703* (2013.01); *G01R 31/31704* (2013.01); *G01R 31/31912* (2013.01); *G01R 31/31932* (2013.01); *G01R 31/318519* (2013.01); *G01R 31/318583* (2013.01); *G06F 11/2226* (2013.01); *G06F 11/2236* (2013.01); *G06F 2115/08* (2020.01)

(58) Field of Classification Search
    CPC .......... G01R 31/31701; G01R 31/3193; G01R 31/31912; G01R 31/31703; G01R 31/318583; G06F 11/2236; G06F 11/2226; G06F 2115/08; G06N 5/02
    See application file for complete search history.

(56) References Cited

U.S. PATENT DOCUMENTS

| | | | |
|---|---|---|---|
| 2010/0066401 A1* | 3/2010 | Mizuno | G01R 31/3008 327/564 |
| 2011/0275170 A1 | 11/2011 | Van Wagenen et al. | |
| 2016/0169971 A1 | 6/2016 | Oomman et al. | |
| 2017/0045579 A1* | 2/2017 | Leung | G06F 11/27 |
| 2019/0267072 A1 | 8/2019 | Torng et al. | |
| 2020/0127666 A1* | 4/2020 | Wang | G01R 31/318519 |
| 2020/0183610 A1* | 6/2020 | Seetharaman | G11C 29/02 |

FOREIGN PATENT DOCUMENTS

| | | |
|---|---|---|
| CN | 109358993 A | 2/2019 |
| CN | 109376041 A | 2/2019 |
| CN | 109634843 A | 4/2019 |
| CN | 109765482 A | 5/2019 |
| CN | 109884499 A | 6/2019 |
| CN | 109919322 A | 6/2019 |
| CN | 109978152 A | 7/2019 |
| CN | 110489861 A | 11/2019 |
| JP | 2013531779 A | 8/2013 |
| KR | 20130066400 A | 6/2013 |

OTHER PUBLICATIONS

Notice of Allowance in KR Patent Application No. 10-2020-0060686 dated Dec. 30, 2021.
Singhal, Rahul, AI Chip DFT Techniques for Aggressive Time-to-Market, Mentor Graphics Corporation, Jan. 31, 2019, pp. 1-10.
Notice of Allowance in CN Patent Application No. 201911420462.8 dated May 12, 2021.
European Search Report in EP Patent Application No. 20204930.0 dated Apr. 28, 2021.
Office Action in KR Patent Application No. 2020-0060686 dated May 28, 2021.
Office Action in JP Patent Application No. 2020085123 dated Jun. 22, 2021.
Simon, Tom, How to be Smart About FT for AI Chips, SemiWiki, Jan. 31, 2019, pp. 1-3.
Singhal, Rahul, DFT That Gets AI Chips to Market Faster, Evaluation Engineering, Jul. 2019, pp. 22-24.
Ma, Haiying et al., A Case Study of Testing Strategy for AI SoC, IEEE International Test Conference in Asia, 2019, pp. 61-66.
First Office Action in JP Patent Application No. 2020-085123 dated Jun. 22, 2021.

* cited by examiner

METHOD AND APPARATUS FOR TESTING ARTIFICIAL INTELLIGENCE CHIP, DEVICE AND STORAGE MEDIUM

CROSS-REFERENCE TO RELATED APPLICATION

This application claims priority to Chinese Patent Application No. 201911420462.8, filed on Dec. 31, 2019, which is hereby incorporated by reference in its entirety.

TECHNICAL FIELD

This disclosure relates to the field of data processing technologies, and especially, to the artificial intelligence technology.

BACKGROUND

With the maturity of the artificial intelligence technology, artificial intelligence chips (referred to as AI chips) have also developed rapidly. How to quickly eliminate unqualified AI chips in large-scale production and how to reduce the test cycle and cost of AI chips become more and more important, and these are inseparable from Design for Test (referred to as DFT).

In prior art, a DFT test is still performed on AI chips in a traditional chip test manner. Because traditional chips often have large heterogeneous IP cores, the DFT tests of the traditional chips are often completed on a chip level or on a large heterogeneous IP core, which also increases the test time of the traditional chips. However, AI chips have a different structure from the traditional chips. An AI chip has numerous same AI arithmetic units to process AI algorithms, the numerous same AI arithmetic units are the core of the entire AI chip, and the AI chip has a huge size.

Therefore, the traditional chips test manner in the prior art is no longer applicable to the AI chips. Using the traditional chip test manner to test the AI chips will increase the test time, cost and test power consumption of the AI chips, and reduce the test efficiency of the AI chips.

SUMMARY

Embodiments of this disclosure provides a method and apparatus for testing an artificial intelligence chip, a device and a storage medium, to solve the technical problem that the traditional chip test manner in the prior art is no longer applicable to the AI chips and that using the traditional chip test manner to test the AI chips increases the test time, cost and test power consumption of the AI chips, and reduces the test efficiency of the AI chips.

A first aspect of the embodiments of the present disclosure provides a method for testing an artificial intelligence chip, wherein a target artificial intelligence chip has multiple same arithmetic units, the method includes:

obtaining scale information of the target artificial intelligence chip; determining whether the target artificial intelligence chip satisfies a test condition of an arithmetic unit array level according to the scale information; dividing all the arithmetic units into multiple same arithmetic unit arrays, and performing a Designed for Test (DFT) test on the arithmetic unit arrays, respectively, if it is determined that the test condition of the arithmetic unit array level is satisfied; performing the DFT test on the arithmetic units, respectively, if it is determined the test condition of the arithmetic unit array level is not satisfied.

In the embodiment of the present disclosure, since the same arithmetic unit arrays or arithmetic units of the artificial intelligence chip are tested respectively, the test logic circuit and the test vector of each arithmetic unit array or arithmetic unit are completely the same, so the test cost is reduced. In addition, the number of transistors in each arithmetic unit or arithmetic unit array is very small, so the size of test vectors is also small, and thus the test time is greatly reduced and the test efficiency is improved. Moreover, loading the DFT of each arithmetic unit or arithmetic unit array will require far less computing and storing resources of the memory, which greatly reduces the test power consumption.

Further, as described above, the scale information includes a number of transistors of an arithmetic unit, and the determining whether the target artificial intelligence chip satisfies a test condition for an arithmetic unit array level according to the scale information, includes:

determining whether the number of the transistors is smaller than a preset scale threshold; determining that the test condition of the arithmetic unit array level is satisfied, if it is determined that the number of the transistors is less than the preset scale threshold; determining that the test condition of the arithmetic unit array level is not satisfied, if it is determined that the number of the transistors is greater than or equal to the preset scale threshold.

In the embodiment of the present disclosure, it is determined whether the number of the transistors is smaller than the preset scale threshold. If it is determined that the number of the transistors is smaller than the preset scale threshold, it means that the size of each arithmetic unit is particularly small. Then, it is determined that the test condition of the arithmetic unit array level is satisfied, and multiple arithmetic units can be assembled to form an arithmetic unit array to perform the test on the arithmetic unit array level. If it is determined that the number of the transistors is greater than or equal to the preset scale threshold, it means that the size of each arithmetic unit is relatively large. Then, it is determined the test condition of the arithmetic unit array level is not satisfied, but the test condition of an arithmetic unit level is satisfied, and the test is performed on the arithmetic unit level. The size of the arithmetic unit array or the arithmetic unit can meet the requirement of an individual test, which can further reduce the test time.

Further, according to the method described above, the dividing all the arithmetic units into multiple same arithmetic unit arrays includes:

determining a number of arithmetic units in an arithmetic unit array according to the number of the transistors and the total number of the arithmetic units; dividing all the arithmetic units into the multiple same arithmetic unit arrays according to the number of the arithmetic units.

In the embodiment of the present disclosure, all the arithmetic units are divided into multiple same arithmetic unit arrays according to the number of the transistors and the total number of the arithmetic units, so that the arithmetic units in the artificial intelligence chip can be evenly divided into the same arithmetic unit arrays, and the size of each arithmetic unit array is not too large, which can meet the requirement of the individual test, and thus can reduce the test time.

Further, as the method described above, each of the arithmetic unit arrays is provided with a first test logic circuit;

the performing a DFT test on the arithmetic unit arrays, respectively, includes:

generating first test vectors corresponding to the arithmetic unit arrays, where the first test vectors corresponding to respective one of the arithmetic unit arrays are the same; performing the DFT test on the arithmetic unit arrays, respectively, by inputting the first test vectors into first test logic circuits corresponding to respective ones of the arithmetic unit arrays, respectively; outputting test results corresponding to respective ones of the arithmetic unit arrays.

In the embodiment of the present disclosure, a first test logic circuit is provided in each arithmetic unit array, and the same first test vector is used to test each arithmetic unit array, respectively, and the test results are output. Since the first test logic circuit and the first test vector of each arithmetic unit array are the same, the test cost is greatly reduced.

Further, as the method described above, the first test logic circuit includes: a first test interface;

the performing the DFT test on the arithmetic unit arrays, respectively, by inputting the first test vectors into first test logic circuit corresponding to respective ones of the arithmetic unit arrays, respectively, includes:

performing the DFT test on the arithmetic unit arrays in parallel, by broadcasting, through respective first test interfaces, the first test vectors to the first test logic circuits of corresponding arithmetic unit arrays.

In the embodiment of the present disclosure, the first test logic circuit includes a first test interface, and the electronic device broadcasts the first test vectors to the first test logic circuits of the corresponding arithmetic unit arrays through respective first test interfaces, so that the DFT test can be performed on each arithmetic unit array simultaneously. On the basis of the above, the test time of the AI chip is reduced to the test time of a single arithmetic unit array, which further greatly reduces the test time.

Further, as the method described above, each of the arithmetic units is provided with a second test logic circuit;

the performing the DFT test on the arithmetic units, respectively, includes:

generating second test vectors corresponding to the arithmetic units, where the second test vectors corresponding to respective ones of the arithmetic units are the same; performing the DFT test on the arithmetic units, respectively, by inputting the second test vectors into second test logic circuits corresponding to respective ones of the arithmetic units, respectively; outputting test results corresponding to respective ones of the arithmetic units.

In the embodiment of the present disclosure, a second test logic circuit is provided in each arithmetic unit, and the same second test vector is used to test each arithmetic unit, respectively, and the test results are output. Since the second test logic circuit and the second test vector of each arithmetic unit are same, the test cost is greatly reduce.

Further, as the method described above, the second test logic circuit includes: a second test interface;

the performing the DFT test on the arithmetic units, respectively, by inputting the second test vectors into second test logic circuits corresponding to respective ones of the arithmetic units, respectively, includes:

performing the DFT test on the arithmetic units in parallel, by broadcasting, through respective second test interfaces, the second test vectors to the second test logic circuits of corresponding arithmetic units.

In the embodiment of the present disclosure, the second test logic circuit includes a second test interface, and the electronic device broadcasts the second test vectors to the second test logic circuits of the corresponding arithmetic units through respective second test interfaces, so that the DFT test can be performed on each arithmetic unit simultaneously. On the basis of the above, the test time of the AI chip is reduced to the test time of a single arithmetic unit, which further greatly reduces the test time.

Further, as the method described above, before the performing a DFT test on the arithmetic unit arrays, respectively, the method further includes:

performing a test on at least one first preset DFT logic circuit in the first test logic circuit at a register-transfer level (RTL) stage of the target artificial intelligence chip; and if the first preset DFT logic circuit fails the test, then repairing the first preset DFT logic circuit at the RTL stage of the target artificial intelligence chip, In the embodiment of the present disclosure, some first preset DFT logic circuits of the first test logic circuit in the DFT of the arithmetic unit array can be designed and tested at the RTL stage of the target artificial intelligence chip, so that a corresponding test can be accomplished earlier, and there is no need to wait for the entire AI chip to complete before starting the design and test. And if the first preset DFT logic circuit fails the test, the first preset DFT logic circuit is modified, and when the modified first preset DFT logic circuit is tested again, the iteration process does not need to be continuously performed between the DFT configuration and the test vectors generation, but instead, the test can be continued before the test vectors are executed, so as to avoid the waste of test time caused by such continuous iteration. The test and repair time of the first preset DFT logic circuit can be effectively reduced.

Further, as the method described above, before the performing the DFT test on the arithmetic units, respectively, the method further includes:

performing a test on at least one second preset DFT logic circuit in the second test logic circuit at the RTL stage of the target artificial intelligence chip; repairing the second preset DFT logic circuit at the RTL stage of the target artificial intelligence chip, if the second preset DFT logic circuit fails the test.

In the embodiment of the present disclosure, some second preset DFT logic circuits of the second test logic circuit in the DFT of the arithmetic unit can be designed and tested at the RTL stage of the target artificial intelligence chip. so that a corresponding test can be completed earlier, and there is no need to wait for the entire AI chip to complete before starting the design and test. And if the second preset DFT logic circuit fails the test, the second preset DFT logic circuit is modified, and when the modified second preset DFT logic circuit is tested again, the iteration process does not need to be continuously performed between the DFT configuration and the generation of test vectors, but instead, the test can be continued before the test vectors are executed, so as to avoid the waste of test time caused by this continuous iteration. The test and repair time of the second preset DFT logic circuit can be reduced.

A second aspect of the embodiments of the present disclosure provides an apparatus for testing an artificial intelligence chip, wherein a target artificial intelligence chip has multiple same arithmetic units, the apparatus includes:

a scale information obtaining module, configured to obtain scale information of the target artificial intelligence chip; a test condition determining module, configured to determine whether the target artificial intelligence chip satisfies a test condition of an arithmetic unit array level according to the scale information; an array testing module, configured to divide all the arithmetic units into multiple same arithmetic unit arrays, and performing a DFT test on the arithmetic unit arrays, respectively, if it is determined that the test condition of the arithmetic unit array level is satisfied; an arithmetic unit testing module, configured to perform the DFT test on the arithmetic units, respectively, if it is determined that the test condition of the arithmetic unit array level is not satisfied.

Further, as the apparatus described above, the scale information comprises a number of transistors in an arithmetic unit, the test condition determining module is specifically configured to:

determine whether the number of the transistors is smaller than a preset scale threshold; determine the test condition of the arithmetic unit array level is satisfied, if it is determined that the number of the transistors is less than the preset scale threshold; determine the test condition of the arithmetic unit array level is not satisfied, if it is determined that the number of the transistors is greater than or equal to the preset scale threshold.

Further, as the apparatus described above, when dividing all arithmetic units into multiple same arithmetic unit arrays, the array testing module is specifically configured to:

determine a number of arithmetic units in an arithmetic unit array according to the number of the transistors and the total number of the arithmetic units; divide all the arithmetic units into the multiple same arithmetic unit arrays according to the number of the arithmetic units.

Further, as the apparatus described above, each of the arithmetic unit arrays is provided with a first test logic circuit;

when performing DFT tests on the arithmetic unit arrays, respectively, the array testing module is specifically configured to:

generate first test vectors corresponding to the arithmetic unit arrays, where the first test vectors corresponding to respective ones of the arithmetic unit arrays are the same; perform the DFT test on the arithmetic unit arrays, respectively, by inputting the first test vectors into first test logic circuits corresponding to respective ones of the arithmetic unit arrays, respectively; outputting test results corresponding to respective ones of the arithmetic unit arrays.

Further, as the apparatus described above, the first test logic circuit comprises: a first test interface;

when performing the DFT test on the arithmetic unit arrays, respectively, by inputting the first test vectors into first test logic circuits corresponding to respective ones of the arithmetic unit arrays, respectively, the array testing module is specifically configured to:

perform the DFT test on the arithmetic unit arrays in parallel by broadcasting, through respective first test interfaces, the first test vectors to the first test logic circuits of corresponding arithmetic unit arrays.

Further, as the apparatus described above, each of the arithmetic units is provided with a second test logic circuit;

when performing the DFT test on the arithmetic units, respectively, the arithmetic unit testing module is specifically configured to:

generate second test vectors corresponding to the arithmetic units, where the second test vectors corresponding to respective ones of the arithmetic units are the same; perform the DFT test on the arithmetic units, respectively, by inputting the second test vectors into second test logic circuits corresponding to respective ones of the arithmetic units, respectively; outputting test results corresponding to respective ones of the arithmetic units.

Further, as the apparatus described above, the second test logic circuit includes: a second test interface;

when performing the DFT test on the arithmetic units, respectively, by inputting the second test vectors into second test logic circuits corresponding to respective ones of the arithmetic units, respectively, the arithmetic unit testing module is specifically configured to:

perform the DFT test on the arithmetic units in parallel by broadcasting, through respective second test interfaces, the second test vectors to the second test logic circuits of corresponding arithmetic units.

Further, the apparatus as described above further includes:

a first circuit testing and repairing module, configured to perform a test on at least one first preset DFT logic circuit in the first test logic circuit at an RTL stage of the target artificial intelligence chip; and repair the first preset DFT logic circuit at the RTL stage of the target artificial intelligence chip if the first preset DFT logic circuit fails the test.

Further, the apparatus as described above further includes:

a second circuit testing and repairing module, configured to perform a test on at least one second preset DFT logic circuit in the second test logic circuit at the RTL stage of the target artificial intelligence chip; repair the second preset DFT logic circuit at the RTL stage of the target artificial intelligence chip, if the second preset DFT logic circuit fails the test.

A third aspect of the embodiments of the present disclosure provides an electronic device, including: at least one processor; and a memory communicatively connected to the at least one processor; wherein, the memory stores instructions executable by the at least one processor, and the instructions when being executed by the at least one processor cause the at least one processor to execute any method according to the first aspect.

A fourth aspect of the embodiments of the present disclosure provides a non-transitory computer-readable storage medium having computer instructions stored thereon, and the computer instructions are used to cause the computer to perform any method according to the first aspect.

A fifth aspect of the embodiments of the present disclosure provides a computer program, including program code, and when a computer runs the computer program, the program code executes the method according to the first aspect.

BRIEF DESCRIPTION OF DRAWINGS

The drawings are used to better understand the solution, and do not constitute a limitation on the disclosure, where.

DESCRIPTION OF EMBODIMENTS

Figure 1:
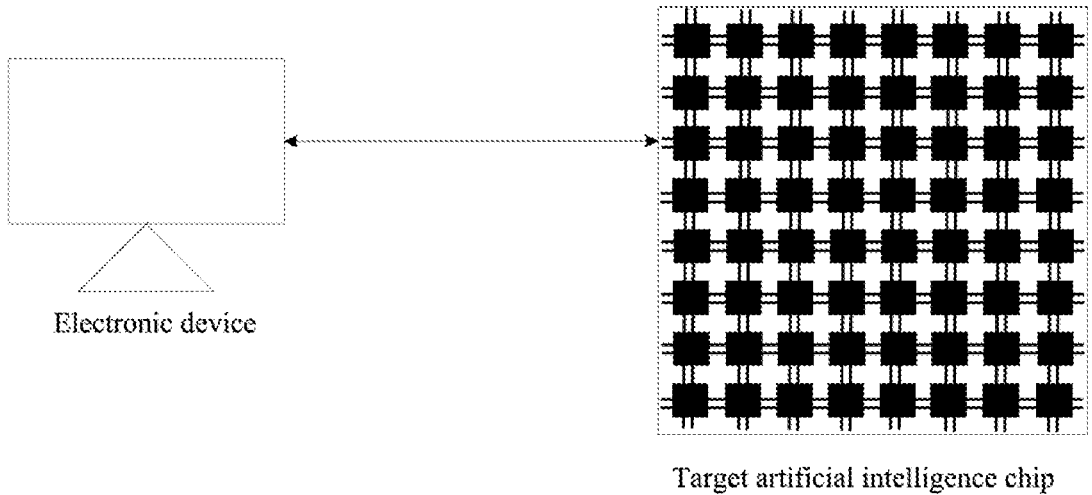
FIG. 1 is a diagram of an disclosure scenario where a method for testing an artificial intelligence chip according to embodiments of the present disclosure can be applied.

The following describes exemplary embodiments of the present disclosure with reference to the drawings, including various details of the embodiments of the present disclosure to facilitate understanding, which should be considered as merely exemplary. Therefore, those skilled in the art should recognize that various changes and modifications can be made to the embodiments described herein without departing from the scope and spirit of the present disclosure. Also, for the sake of clarity and conciseness, descriptions of well-known functions and structures are omitted in the following description.

In order to clearly understand the technical solution of this disclosure, the terms involved in the prior art and the present disclosure are explained in the following.

Artificial intelligence chip: also called AI accelerator or computing card, is a module dedicated to processing a large number of computing tasks in artificial intelligence disclosures. CPU is still responsible for other non-computing tasks. AI chips are mainly divided into GPUs, FPGAs, and ASICs. In an AI chip, an algorithm logic unit is the core of the entire AI chip, and usually occupies a high proportion in the entire AI chip. The AI algorithm logic unit is usually composed of the same arithmetic units. Moreover, the size of an AI chip is huge, so there are a large number of same arithmetic units in the AI chip.

Traditional chip: a traditional chip often has multiple large heterogeneous IP cores, such as a power consumption control module, a communication interface module, a video analysis module, etc.

Design for Test: DFT for short, is an integrated circuit design technology. The main task is to design a specific test logic circuit by adding logic, replacing components and adding pins, etc., and meanwhile adjust the structure of the circuit under test to improve the testability, i.e. the controllability and observability, of the circuit. Adding these structures in the design stage increases the complexity of the circuit and seems to increase the cost, but it can often save more time and cost in the test stage.

In order to clearly understand the technical solution of the present disclosure, the method for testing an AI chip in the prior art is first introduced in detail. In the prior art, a DFT test of an AI chip is generally a chip-level test. When a chip-level test is performed, a test machine has a limit on how many test units are connected in series to form a scan chain, so firstly, scan chains are inserted between the arithmetic units of the AI chip, and each scan chain is connected to a different number of arithmetic units. Then each scan chain is provided with a test logic circuit, and a test vector corresponding to each scan chain is generated, and each scan chain corresponds to a different test logic circuit and test vector. The test machine sends the test vector corresponding to each scan chain to the AI chip to input the test vector into the test logic circuit of the corresponding scan chain, so as to complete the test of the arithmetic units on the scan chain. Because there are many arithmetic units on each scan chain, the size of the test vector is generally very large, and the test time will be very long. Moreover, the test logic circuit on each scan chain is different with each other, and the test vector is also different, so the test cost is increased. Loading the entire DFT requires a large number of computing and storing resources of the memory, and the test power consumption is also be constrained.

Since the structure of the AI chip is different from the traditional chip, the AI chip has a huge size and includes a large number of the same arithmetic units. The large numbers of the same arithmetic units occupy a major proportion of the AI chip. Therefore, based on the structural characteristics of the AI chip and aiming at the technical problem of the method for testing an AI chip in the prior art, the embodiments of the present disclosure propose a method for testing an AI chip.

The disclosure scenario of the method for testing an artificial intelligence chip provided in the embodiments of the present disclosure is introduced below. As shown in FIG. 1, the disclosure scenario corresponding to the method for testing an artificial intelligence chip provided in the embodiments of the present disclosure includes: an electronic device and a target artificial intelligence chip. The electronic device may be a test machine. And the electronic device can communicate with the target artificial intelligence chip. Scale information of the target artificial intelligence chip can be obtained. Since the target artificial intelligence chip has multiple same arithmetic units, whether the target artificial intelligence chip satisfies a test condition of an arithmetic unit array level is determined according to the scale information. If it is determined that the test condition of the arithmetic unit array level is satisfied, all the arithmetic units are divided into multiple same arithmetic unit arrays, and a DFT test is performed on each arithmetic unit array, respectively. If it is determined that the test condition of the arithmetic unit array level is not satisfied, the DFT test is performed on each arithmetic unit, respectively. Then, the DFT test of the artificial intelligence chip is completed. After the DFT test is performed on each arithmetic unit array, respectively, a test result of each arithmetic unit array is determined. Or, after the DFT test is performed on each arithmetic unit, respectively, a test result of each arithmetic unit is determined. The arithmetic unit array or arithmetic unit that failed the test is repaired. Since the same arithmetic unit arrays or arithmetic units of the artificial intelligence chip are tested respectively, the test logic circuit and the test vector of each arithmetic unit array or arithmetic unit are completely the same, and thus the test cost is reduced. In addition, there are a small number of the transistors in each arithmetic unit or arithmetic unit array, so the size of the test vector is also small, and thus the test time is greatly reduced and the test efficiency is improved. In addition, loading the DFT of each arithmetic unit or arithmetic unit array requires far less computing and storing resources of the memory, which greatly reduces the test power consumption.

The embodiments of the present disclosure will be described in detail below with reference to the drawings.

First Embodiment

Figure 2:
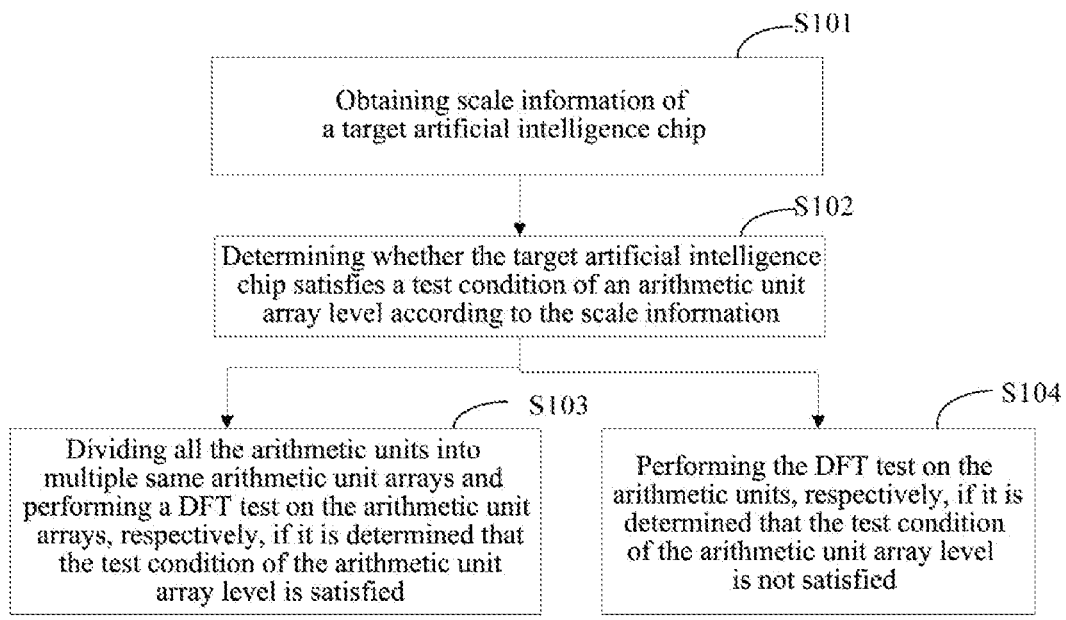
FIG. 2 is a schematic flowchart of a method for testing an artificial intelligence chip according to a first embodiment of the present disclosure.

FIG. 2 is a schematic flowchart of a method for testing an artificial intelligence chip according to the first embodiment of the present disclosure. As shown in FIG. 2, the executive entity of the embodiment of the present disclosure is an apparatus for testing an artificial intelligence chip. The apparatus for testing an artificial intelligence chip may be integrated in an electronic device, and the electronic device may be a test machine. The method for testing an artificial intelligence chip provided in this embodiment includes the following steps.

Step 101: obtaining scale information of a target artificial intelligence chip.

In this embodiment, the target artificial intelligence chip is an artificial intelligence chip that needs to be tested. The target artificial intelligence chip includes multiple same arithmetic units.

In this embodiment, in an early stage of the design of the target artificial intelligence chip, the scale information of the target artificial intelligence chip can be stored in a storage device. The storage device may be a computer, a U disk, a magnetic disk or other devices, and the scale information of the target artificial intelligence chip can be obtained by accessing the storage device.

The scale information may include: the total number of arithmetic units, a number of transistors in each arithmetic unit, and so on.

The transistors in the arithmetic units are a kind of semiconductor devices, which are basic building blocks of the arithmetic units.

Step 102: determining whether the target artificial intelligence chip satisfies a test condition of an arithmetic unit array level according to the scale information.

As an optional implementation, in this embodiment, whether the target artificial intelligence chip satisfies the test condition of the arithmetic unit array level can be determined according to the total number of the arithmetic units. If the total number of the arithmetic units is small, then the DFT test can be performed on each arithmetic unit respectively, then it is determined that the test condition of the arithmetic unit array level is not satisfied. If the total number of the arithmetic units is large, it is determined that the test condition of the arithmetic unit array level is satisfied. Then, the DFT test can be performed on each arithmetic unit array, respectively.

When determining whether the total number of the arithmetic units is large or small, the total number of the arithmetic units may be compared with a preset number threshold. If the total number of the arithmetic units is less than the preset number threshold, it is determined that the total number of the arithmetic units is small. If the total number of the arithmetic units is greater than or equal to the preset number threshold, it is determined that the total number of the arithmetic units is large.

As another optional implementation, in this embodiment, whether the target artificial intelligence chip satisfies the test condition of the arithmetic unit array level may also be determined according to the number of transistors in an arithmetic unit. If it is determined that the number of the transistors is smaller than a preset scale threshold, it means that the size of each arithmetic unit is small, and it is determined that the test condition of the arithmetic unit array level is satisfied, and the DFT test may be performed on each arithmetic unit array, respectively. If it is determined that the number of the transistors is greater than or equal to the preset scale threshold, it is determined the test condition of the arithmetic unit array level is not satisfied, and the DFT test may be performed on each arithmetic unit, respectively.

It can be understood that whether the target artificial intelligence chip satisfies the test condition of the arithmetic unit array level can be determined according to the scale information in other ways, which is not limited in this embodiment.

Step 103: dividing all the arithmetic units into multiple same arithmetic unit arrays and performing a DFT test on the arithmetic unit arrays, respectively, if it is determined that the test condition of the arithmetic unit array level is satisfied.

In this embodiment, when all the arithmetic units are divided into multiple same arithmetic unit arrays, all the arithmetic units may be divided into multiple same arithmetic unit arrays according to the total number of the arithmetic units. That is, the number of arithmetic units included in each arithmetic unit array is the same. Or, all the arithmetic units are divided into multiple identical arithmetic unit arrays in other ways, which is not limited in this embodiment.

Figure 3:
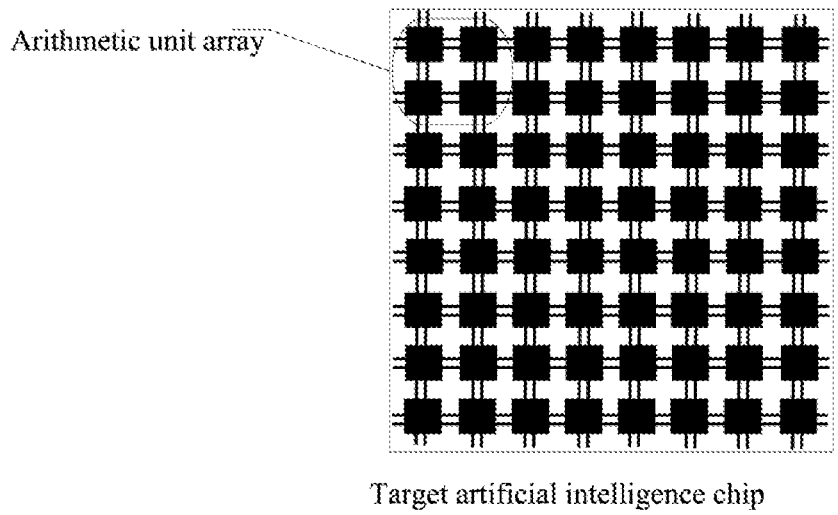
FIG. 3 is a schematic diagram of a divided arithmetic unit array in the method for testing an artificial intelligence chip according to the first embodiment of the present disclosure.

As shown in FIG. 3, sixty-four arithmetic units are included in FIG. 3, and the arithmetic units are divided into sixteen arithmetic unit arrays, and each arithmetic unit array includes four arithmetic units. The four arithmetic units encircled in FIG. 3 form one arithmetic unit array.

In this embodiment, when the DFT test is performed on the arithmetic unit arrays, respectively, a test logic circuit needs to be provided in each arithmetic unit array, where the test logic circuit includes a scan chain, and the scan chain is inserted into the arithmetic unit array. Test vectors for the arithmetic unit arrays can also be generated to complete the DFT test for each arithmetic unit array.

It can be understood that, since all the arithmetic unit arrays are the same, the test logic circuits and scan chains provided, as well as the test vectors generated, are the same.

It is worth noting that, when the DFT test is performed on the arithmetic unit arrays, respectively, the DFT test may be performed on an arithmetic unit array after the DFT test on another arithmetic unit array is completed. Or, the arithmetic unit arrays may be divided into different groups, and the DFT test is performed on a group of arithmetic unit arrays in parallel after the DFT test on another group of arithmetic unit arrays is completed in parallel. Or, the DFT test may be performed on all the arithmetic unit arrays in parallel simultaneously, which is not limited in this embodiment.

Step 104: performing the DFT test on the arithmetic units, respectively, if it is determined that the test condition of the arithmetic unit array level is not satisfied.

In this embodiment, if it is determined that the test condition of the arithmetic unit array level is not satisfied, it means that the test condition of the arithmetic unit level is satisfied, and then the DFT test is performed on the arithmetic units, respectively.

When performing the DFT test on each arithmetic unit, a test logic circuit needs to be provided in each arithmetic unit, where the test logic circuit includes a scan chain, and the scan chain is inserted into the arithmetic unit. Test vectors for the arithmetic units may also be generated to complete the DFT test on each arithmetic unit.

In this embodiment, since all the arithmetic units are the same, the test logic circuits and scan chains provided to the arithmetic units, as well as the test vectors generated, are the same.

Similarly, when the DFT test is performed on the arithmetic units, respectively, the DFT test may be performed on an arithmetic unit after the DFT test on another arithmetic unit is completed, or the DFT test may be performed on all the arithmetic units in parallel simultaneously, which is not limited in this embodiment.

It can be understood that the test logic circuit corresponding to the arithmetic unit array is different from the test logic circuit corresponding to the arithmetic unit. The test vector corresponding to the arithmetic unit array and the test vector corresponding to the arithmetic unit are also different.

According to the method for testing an artificial intelligence chip provided in this embodiment, scale information of a target artificial intelligence chip is obtained; whether the target artificial intelligence chip satisfies a test condition of an arithmetic unit array level is determined according to the scale information; all the arithmetic units are divided into multiple same arithmetic unit arrays and a DFT test is performed on the arithmetic unit arrays, respectively, if it is determined the test condition of the arithmetic unit array level is satisfied; the DFT test is performed on the arithmetic units, respectively, if it is determined that the test condition of the arithmetic unit array level is not satisfied. Since the same arithmetic unit arrays or arithmetic units of the artificial intelligence chip are tested respectively, the test logic circuit and the test vector of each arithmetic unit array or arithmetic unit are completely the same, so the test cost is reduced. In addition, there are a small number of the transistors in each arithmetic unit or arithmetic unit array, so the size of the test vector is also small, and thus the test time is greatly reduced and the test efficiency is improved. Moreover, loading the DFT of each arithmetic unit or arithmetic unit array requires far less computing and storing resources of the memory, which greatly reduces the test power consumption.

Second Embodiment

Figure 4:
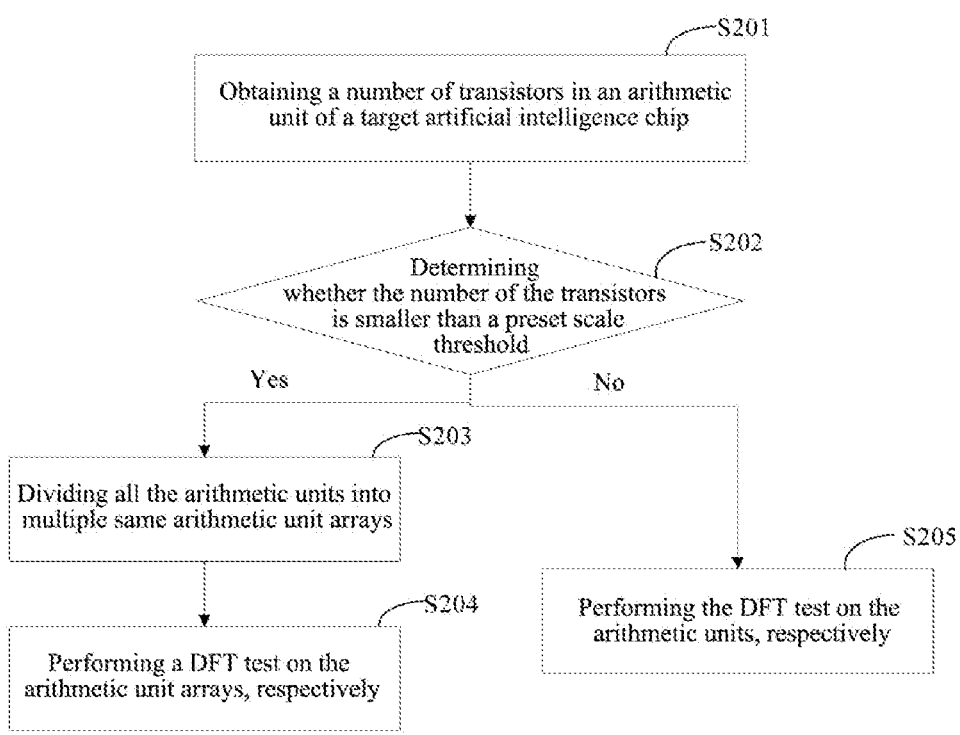
FIG. 4 is a schematic flowchart of a method for testing an artificial intelligence chip according to a second embodiment of the present disclosure.

FIG. 4 is a schematic flowchart of a method for testing an artificial intelligence chip according to the second embodiment of the present disclosure. As shown in FIG. 4, the method for testing an artificial intelligence chip provided in this embodiment further refines steps 101-104 based on the method for testing an artificial intelligence chip provided in the first embodiment of the present disclosure. The method for testing an artificial intelligence chip provided in this embodiment includes the following steps.

Step 201: obtaining a number of transistors in an arithmetic unit of a target artificial intelligence chip.

Further, in this embodiment, the number of the transistors in the arithmetic unit of the artificial intelligence chip is directly obtained, so as to determine, according to the number of the transistors, whether to perform the test on an arithmetic unit array level or on an arithmetic unit level.

Step 202: determining whether the number of the transistors is smaller than a preset scale threshold, if yes, performing step 203, otherwise, performing step 205.

The value of the preset scale threshold is not limited, which can be determined according to multiple tests.

In this embodiment, it is determined whether the number of the transistors is smaller than the preset scale threshold. If it is determined that the number of the transistors is smaller than the preset scale threshold, then it means that the size of each arithmetic unit is particularly small, it is determined that the test condition of the arithmetic unit array level is satisfied, and multiple arithmetic units can be assembled to form an arithmetic unit array to perform the test on the arithmetic unit array level. If it is determined that the number of the transistors is greater than or equal to the preset scale threshold, then it means that the size of each arithmetic unit is relatively large, it is determined the test condition of the arithmetic unit array level is not satisfied, but the test condition of the arithmetic unit level is satisfied, and the test is performed on the arithmetic unit level.

In this embodiment, the determination on whether the test condition of the arithmetic unit array is satisfied is performed by determining whether the number of the transistors in the arithmetic unit is less than the preset scale threshold, so that the size of the arithmetic unit array or arithmetic unit can meet the requirement of an individual test, further reducing the test time.

Step 203: dividing all the arithmetic units into multiple same arithmetic unit arrays.

Figure 5:
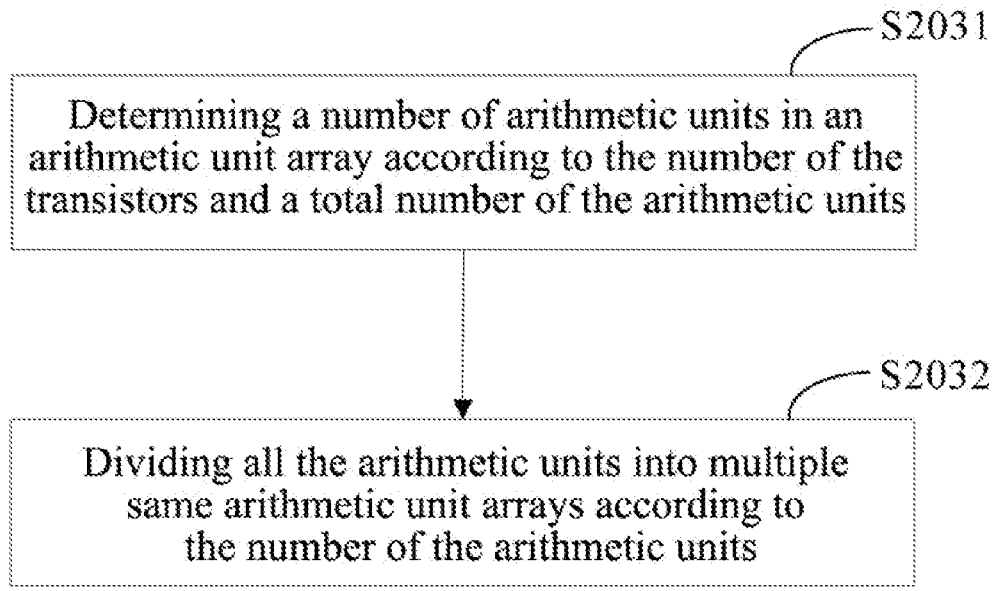
FIG. 5 is a schematic flowchart of step 203 in the method for testing an artificial intelligence chip according to the second embodiment of the present disclosure.

As an optional implementation, as shown in FIG. 5, step 203 includes the following steps.

Step 2031: determining a number of arithmetic units in an arithmetic unit array according to the number of the transistors and the total number of the arithmetic units.

Further, in this embodiment, firstly, candidate numbers of arithmetic unit arrays into which all arithmetic units can be divided are determined according to the total number of the arithmetic units. That is, the total number of the arithmetic units can be divided by each candidate number of the arithmetic unit arrays. Then, the number of the arithmetic unit arrays is finally determined from the candidate numbers of the arithmetic unit arrays according to the number of the transistors in the arithmetic unit.

When the number of the arithmetic unit arrays is finally determined from the candidate numbers of the arithmetic unit arrays according to the number of the transistors in the arithmetic unit, it is necessary to ensure that the total number of the transistors in each arithmetic unit array is less than a preset maximum scale, so that the total number of the transistors in each arithmetic unit array is not too large.

The preset maximum scale is greater than the preset scale threshold, but the specific value thereof is not limited herein. It can be set after some tests.

Step 2032: dividing all the arithmetic units into multiple same arithmetic unit arrays according to the number of the arithmetic units.

In this embodiment, all arithmetic units are divided into multiple same arithmetic unit arrays according to the number of the arithmetic units included in each arithmetic unit array. Moreover, several arithmetic units near a region can be divided into an arithmetic unit array.

In this embodiment, according to the number of the transistors and the total number of the arithmetic units, all the arithmetic units are divided into multiple same arithmetic unit arrays, so that the arithmetic units in the artificial intelligence chip can be evenly divided into the same arithmetic unit arrays, and the size of each arithmetic unit array is not too large, which can meet the requirement of the individual test, and further reduce the test time.

Step 204: performing a DFT test on the arithmetic unit arrays, respectively.

Figure 6:
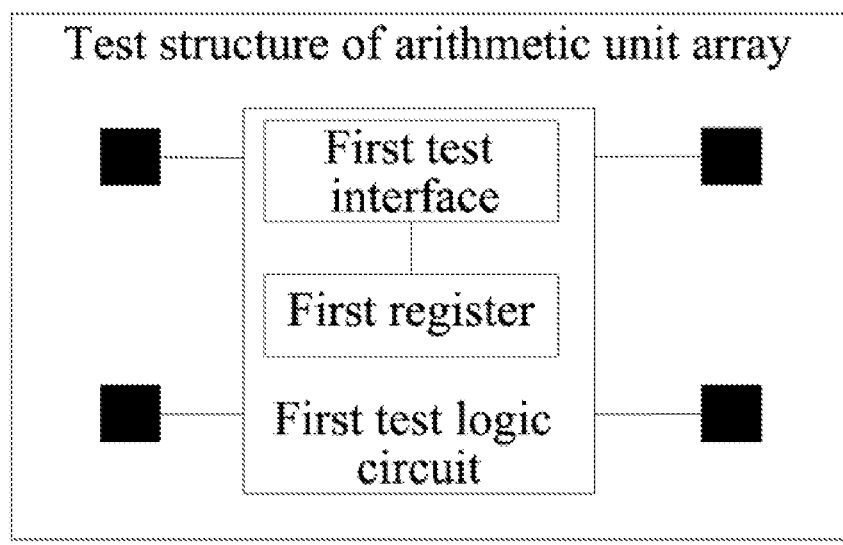
FIG. 6 is a schematic diagram of a test structure of an arithmetic unit array in the method for testing an artificial intelligence chip according to the second embodiment of the present disclosure.

As shown in FIG. 6, each arithmetic unit array is provided with a first test logic circuit. The first test logic circuit is a test logic circuit that tests the arithmetic unit array. The first test logic circuit may include: a first test interface, a first control logic circuit, at least one first register, a first scan chain, and the like. The first test logic circuit is connected to the corresponding arithmetic unit array. The first scan chain can be connected to respective arithmetic units in the arithmetic unit array.

Figure 7:
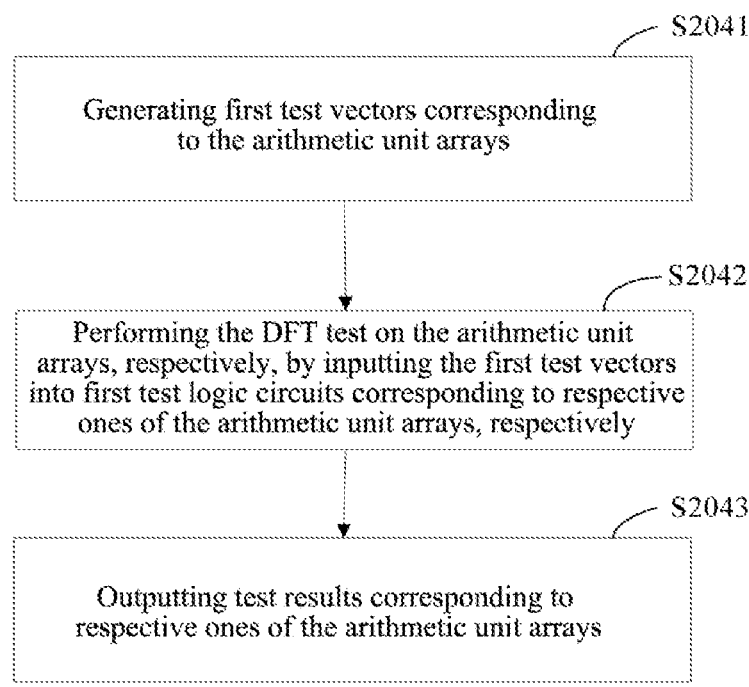
FIG. 7 is a schematic flowchart of step 204 in the method for testing an artificial intelligence chip according to the second embodiment of the present disclosure.

As an optional implementation, as shown in FIG. 7, in this embodiment, step 204 includes the following steps.

Step 2041: generating first test vectors corresponding to the arithmetic unit arrays.

The test vectors corresponding to the arithmetic unit arrays are the first test vectors and the first test vectors corresponding to respective ones of the arithmetic unit arrays are the same.

In this embodiment, the first test vector can be generated according to the function to be completed by each arithmetic unit array and according to the first test logic circuit, to enable the first test vector to perform a full-range test on each arithmetic unit array to achieve the best test coverage.

Step 2042: performing the DFT test on the arithmetic unit arrays, respectively, by inputting the first test vectors into first test logic circuits corresponding to respective ones of the arithmetic unit arrays, respectively.

As an optional implementation, in this embodiment, step 2042 specifically includes:

performing the DFT test on the arithmetic unit arrays in parallel by broadcasting, through respective first test interfaces, the first test vectors to the first test logic circuits of corresponding arithmetic unit arrays.

Figure 8:
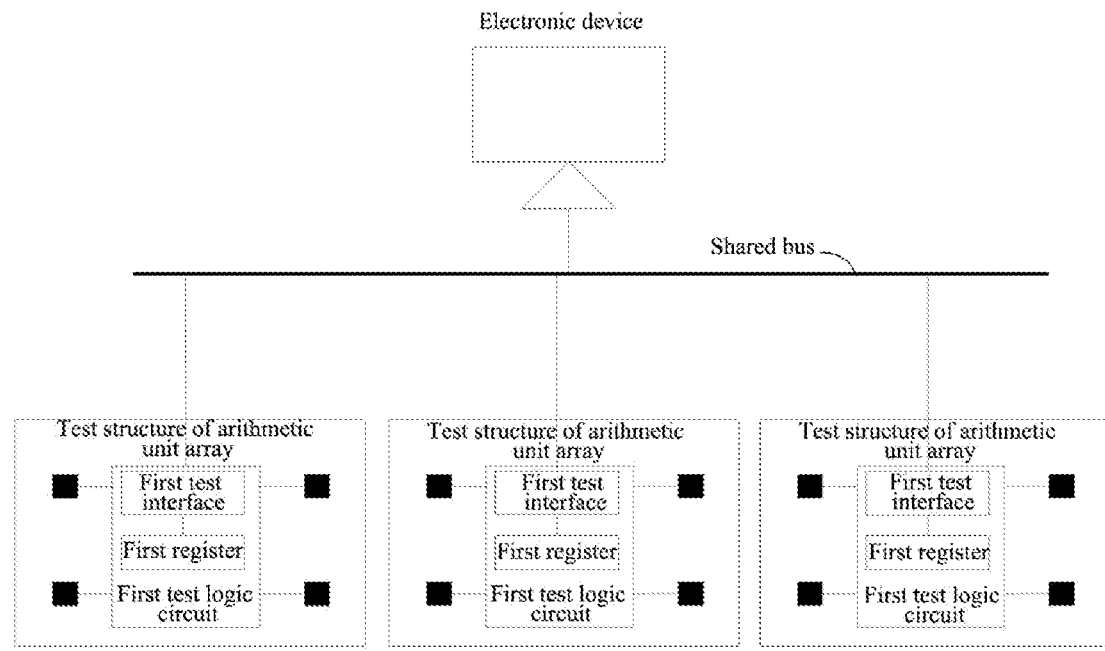
FIG. 8 is a schematic diagram of a structure between the electronic device and the test structure of each arithmetic unit array according to the second embodiment of the present disclosure.

In this embodiment, as shown in FIG. 8, a shared bus may be provided between the electronic device and the AI chip, and the shared bus is respectively connected to each first test interface. Specifically, when performing a DFT test on each arithmetic unit array, correct data may be broadcasted to the first register of the first test logic circuit in the arithmetic unit array corresponding to each first test interface through the shared bus at the first clock. The first test vector may be sent to the shared bus and then broadcasted to the first test logic circuit of the arithmetic unit array via the shared bus and through each first test interface at the second clock. The first test logic circuit of each arithmetic unit array processes the first test vector in parallel, then obtains test data, respectively, and compares the test data with corresponding correct data. If the test data is consistent with the corresponding correct data, it is determined that the arithmetic unit array passes the DFT test, otherwise it is determined that the arithmetic unit array fails the DFT test.

In this embodiment, the first test logic circuit includes a first test interface, and the electronic device broadcasts the first test vectors to the first test logic circuits of the corresponding arithmetic unit arrays through respective first test interfaces, so that the DFT test can be performed on the arithmetic unit arrays in parallel simultaneously. On the basis of the above, the test time of the AI chip is reduced to the test time of a single arithmetic unit array, which further greatly reduces the test time.

Step 2043: outputting test results corresponding to respective ones of the arithmetic unit arrays.

In this embodiment, the first test logic circuit may further include a first output interface to output a test result corresponding to the corresponding arithmetic unit array. The test result may include whether the test is passed, and if the test is failed, the test result may also include test data to diagnose the failure of the arithmetic unit array.

Step 205: performing the DFT test on the arithmetic units, respectively.

Figure 9:
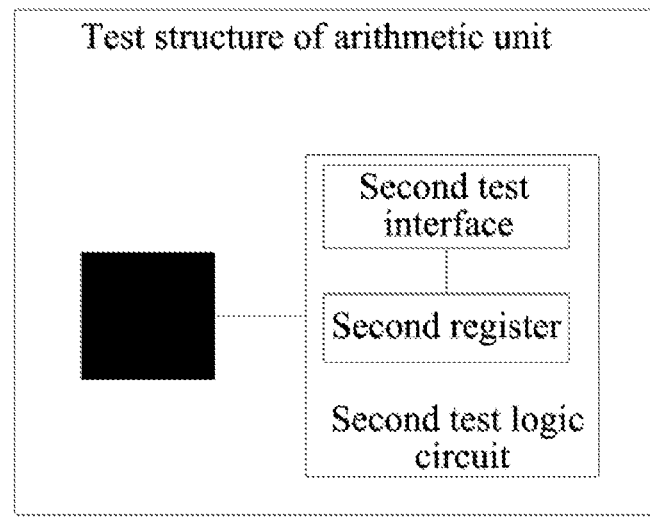
FIG. 9 is a schematic diagram of a test structure of an arithmetic unit in the method for testing an artificial intelligence chip according to the second embodiment of the present disclosure.

As shown in FIG. 9, each arithmetic unit is provided with a second test logic circuit. The second test logic circuit is a test logic circuit that tests the arithmetic unit. The second test logic circuit may include: a second test interface, a second control logic circuit, at least one second register, a second scan chain, and the like. The second test logic circuit is connected to the corresponding arithmetic unit. The second scan chain may be connected to transistors in the arithmetic unit.

Figure 10:
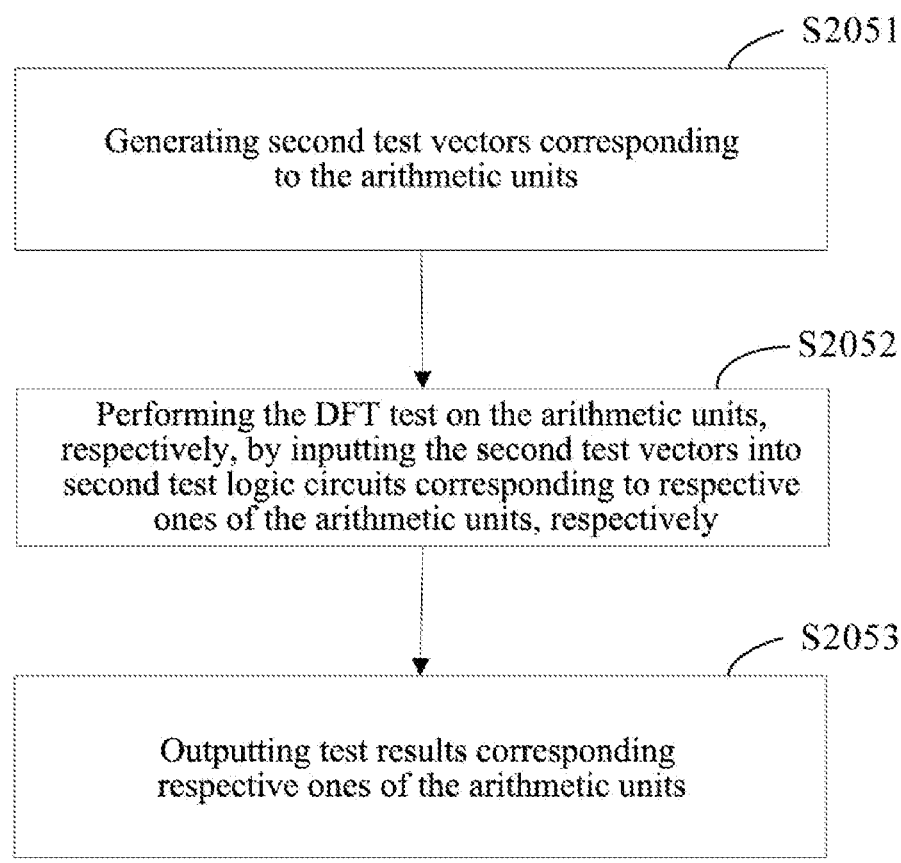
FIG. 10 is a schematic flowchart of step 205 in the method for testing an method for artificial intelligence chip according to the second embodiment of the present disclosure.

As an optional implementation, as shown in FIG. 10, step 205 includes the following steps.

Step 2051: generating second test vectors corresponding to the arithmetic units.

The test vectors corresponding to the arithmetic units are the second test vectors and the second test vectors corresponding to respective ones of the arithmetic units are the same.

In this embodiment, the second test vectors can be generated according to the function to be completed by each arithmetic unit and according to the second test logic circuit, to enable the second test vector to perform a full-range test on each arithmetic unit to achieve the best test coverage.

Step 2052: performing the DFT test on the arithmetic units, respectively, by inputting the second test vectors into second test logic circuits corresponding to respective ones of the arithmetic units, respectively.

As an optional implementation, in this embodiment, step 2052 specifically includes:

performing the DFT test on the arithmetic units in parallel by broadcasting, through respective second test interfaces, the second test vectors to the second test logic circuits of corresponding arithmetic units.

Figure 11:
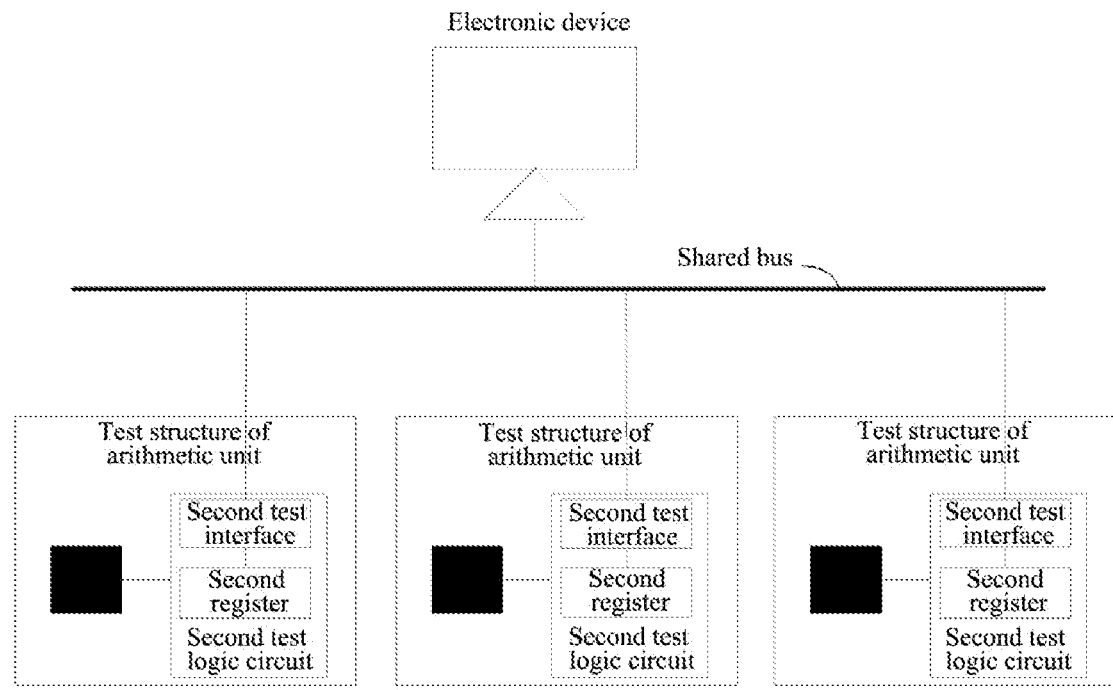
FIG. 11 is a schematic diagram of a structure between the electronic device and the test structure of each arithmetic unit according to the second embodiment of the present disclosure.

In this embodiment, as shown in FIG. 11, a shared bus may be provided between the electronic device and the AI chip, and the shared bus is respectively connected to each second test interface. Specifically, when performing the DFT test on each arithmetic unit, correct data may be broadcasted to the second register of the second test logic circuit in the arithmetic unit corresponding to each second test interface through the shared bus at the first clock. The second test vectors may be sent to the shared bus and then broadcasted to the second test logic circuit of the corresponding arithmetic unit via the shared bus through each second test interface at the second clock. The second test logic circuit of each arithmetic unit processes the second test vector in parallel, then obtains test data, respectively, and compares the test data with corresponding correct data. If the test data is consistent with the corresponding correct data, it is determined that the arithmetic unit passes the DFT test, otherwise, it is determined that the arithmetic unit fails the DFT test.

In this embodiment, the second test logic circuit includes a second test interface, and the electronic device broadcasts the second test vectors to the second test logic circuits of the corresponding arithmetic units through respective second test interfaces, so that the DFT test can be performed on the arithmetic units in parallel simultaneously. On the basis of the above, the test time of the AI chip is reduced to the test time of a single arithmetic unit, which further greatly reduces the test time.

Step 2053: outputting test results corresponding respective ones of the arithmetic units.

In this embodiment, the second test logic circuit may further include a second output interface to output a test result corresponding to the corresponding arithmetic unit. The test result may include whether the test is passed, and if the test is failed, the test result may also include test data to diagnose the failure of the arithmetic unit.

Figure 12:
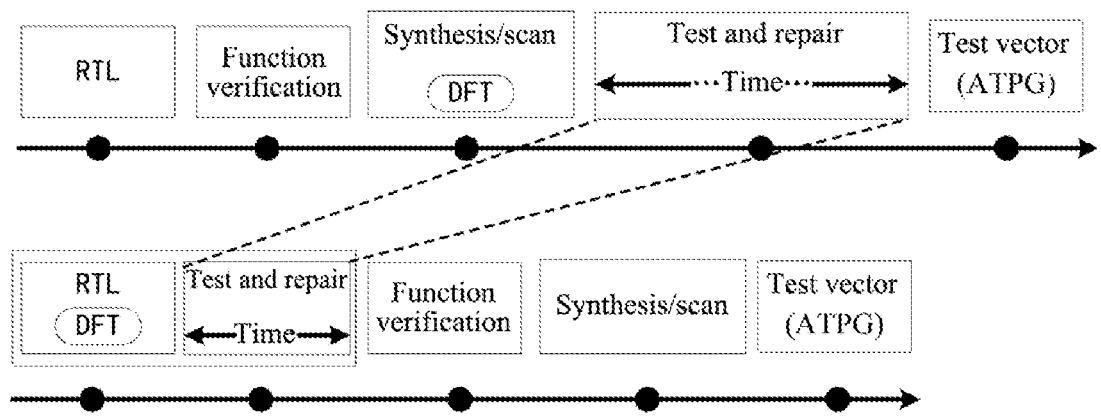
FIG. 12 is a comparison diagram between the test flows of artificial intelligence chip in the prior art and in the embodiments of the present disclosure.

As shown in the upper part of FIG. 12, in the prior art, the DFT test is performed on an AI chip in an AI chip synthesis stage after the design of the AI chip is completed and the function verification of the AI chip is passed. Since the DFT test of the AI chip can be performed only after the entire AI chip is completed, the test is performed on the AI chip later in the entire process of the AI chip, which delays the test time of the AI chip. And if the function of the AI chip is updated, the DFT test needs to be performed on the AI chip again. Therefore, the DFT test cycle will be limited by the entire AI chip design and development process. In addition, in the DFT design for the entire AI chip, continuous iteration between DFT configuration and test vectors generation is needed to achieve the best test coverage. Since the iterative process needs to be performed at the entire AI chip level, such iteration will consume a lot of time.

Therefore, in this embodiment, as shown in the lower part of FIG. 12, if the DFT test is performed on the arithmetic unit arrays, respectively, then before step 204, the method further includes:

performing a test on at least one first preset DFT logic circuit in the first test logic circuit at an RTL stage of the target artificial intelligence chip, and if the first preset DFT logic circuit fails the test, then repairing the first preset DFT logic circuit at the RTL stage of the target artificial intelligence chip.

The first preset DFT logic circuit may include: a test protocol Internal Joint Test Action Group (IJTAG) logic circuit, a memory built-in self-test circuit and boundary scan circuit, an on-chip clock controller, an uncontrollable asynchronous set/reset circuit for flip-flops, a clock analysis circuit for flip-flip scannability, a control logic circuit for memory test, a control logic circuit for IJTAG network scan test, etc.

Specifically, in this embodiment, the functional design of the arithmetic units in the artificial intelligence chip is generally stable in an early stage of the chip design, so some first preset DFT logic circuits of the first test logic circuit in the DFT of the corresponding arithmetic unit array can be designed and tested at the RTL stage of the target artificial intelligence chip to complete the corresponding test earlier, without having to wait for the entire AI chip to be completed before starting the design and test.

In this embodiment, the method for testing each first preset DFT logic circuit at the RTL stage of the target artificial intelligence chip is different from the method for testing each first preset DFT logic circuit at the synthesis stage in the prior art in that: if the first preset DFT logic circuit fails the test, the first preset DFT logic circuit is modified, and when the test is performed on the modified first preset DFT logic circuit again, the iteration process does not need to be continuously performed between the DFT configuration and test vectors generation, but the test can be continued before the test vectors are executed, to avoid the waste of test time caused by such continuous iteration. As shown in the comparison between the upper and lower parts in FIG. 12, it can be seen that the test and repair time for the first preset DFT logic circuit is significantly shorter than the test and repair time in the prior art.

Similarly, if the DFT test is performed on the arithmetic units, respectively, then before step 205, the method further includes:

performing a test on at least one second preset DFT logic circuit in the second test logic circuit at the RTL stage of the target artificial intelligence chip; and if the second preset DFT logic circuit fails the test, repairing the second preset DFT logic circuit at the RTL stage of the target artificial intelligence chip.

The second preset DFT logic circuit may also include: a test protocol IJTAG logic circuit, a memory built-in self-test circuit and boundary scan circuit, an on-chip clock controller, an uncontrollable asynchronous set/reset circuit for flip-flops, a clock analysis circuit for flip-flop scannability, a control logic circuit for memory test, a control logic circuit for IJTAG network scan test, etc.

Specifically, in this embodiment, the functional design of the arithmetic unit in the artificial intelligence chip is generally stable in an early stage of the chip design, so some second preset DFT logic circuits of the second test logic circuit in the DFT of the corresponding arithmetic unit can be designed and tested at the RTL stage of the target artificial intelligence chip to complete the corresponding test earlier, without having to wait for the entire AI chip to be completed before starting the design and test.

The principle of testing and repairing the second preset DFT logic circuit is similar to the principle of testing and repairing the first preset DFT logic circuit in the arithmetic unit array, and details are not repeated here.

In this embodiment, the first preset DFT logic circuit and the second preset DFT logic circuit can be designed and tested at the RTL stage of the target artificial intelligence chip to complete the corresponding test earlier, without waiting for the entire AI chip to complete before starting to design and test. And if the first preset DFT logic circuit or the second preset DFT logic circuit fails the test, the first preset DFT logic circuit or the second preset DFT logic circuit is modified, and when the test is performed on the modified first preset DFT logic circuit or the second preset DFT logic circuit again, the iteration process does not need to be continuously performed between the DFT configuration and test vectors generation, but the test can be continued before the test vectors are executed, to avoid the waste of test time caused by such continuous iteration. The test and repair time of the first preset DFT logic circuit and the second preset DFT logic circuit can be effectively reduced.

It should be noted that each black block in FIG. 1, FIG. 3, FIG. 6, FIGS. 8-9 and FIG. 11 represents an arithmetic unit.

Third Embodiment

Figure 13:
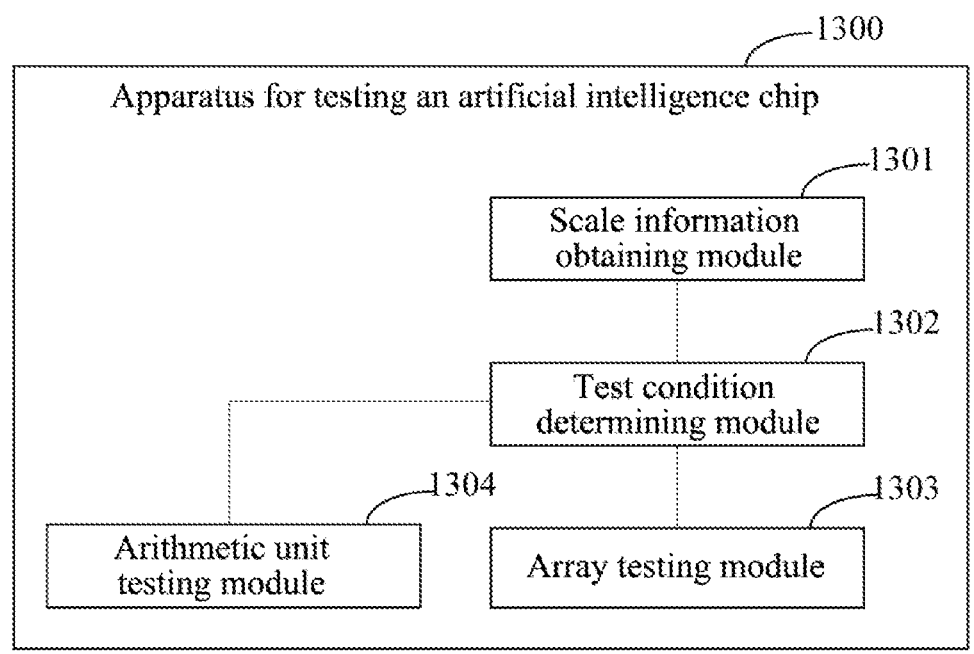
FIG. 13 is a schematic structural diagram of an apparatus for testing an artificial intelligence chip according to a third embodiment of the present disclosure.

FIG. 13 is a schematic structural diagram of an apparatus for testing an artificial intelligence chip according to the third embodiment of the present disclosure. As shown in FIG. 13, the apparatus for testing an artificial intelligence chip provided in this embodiment is located in an electronic device. A target artificial intelligence chip has multiple same arithmetic units, and the apparatus 1300 for testing an artificial intelligence chip includes: a scale information obtaining module 1301, a test condition determining module 1302, an array testing module 1303 and an arithmetic unit testing module 1304.

The scale information obtaining module 1301 is configured to obtain scale information of the target artificial intelligence chip. The test condition determining module 1302 is configured to determine whether the target artificial intelligence chip satisfies a test condition of an arithmetic unit array level according to the scale information. The array testing module 1303 is configured to divide all the arithmetic units into multiple same arithmetic unit arrays, and perform a DFT test on the arithmetic unit arrays, respectively, if it is determined that the test condition of the arithmetic unit array level is satisfied. The arithmetic unit testing module 1304 is configured to perform the DFT test on the arithmetic units, respectively, if it is determined that the test condition of the arithmetic unit array level is not satisfied.

The apparatus for testing an artificial intelligence chip provided in this embodiment can execute the technical solution of the method embodiment shown in FIG. 2, and its implementation principle and technical effects are similar to the method embodiment shown in FIG. 2, and details are not repeated herein.

Fourth Embodiment

Figure 14:
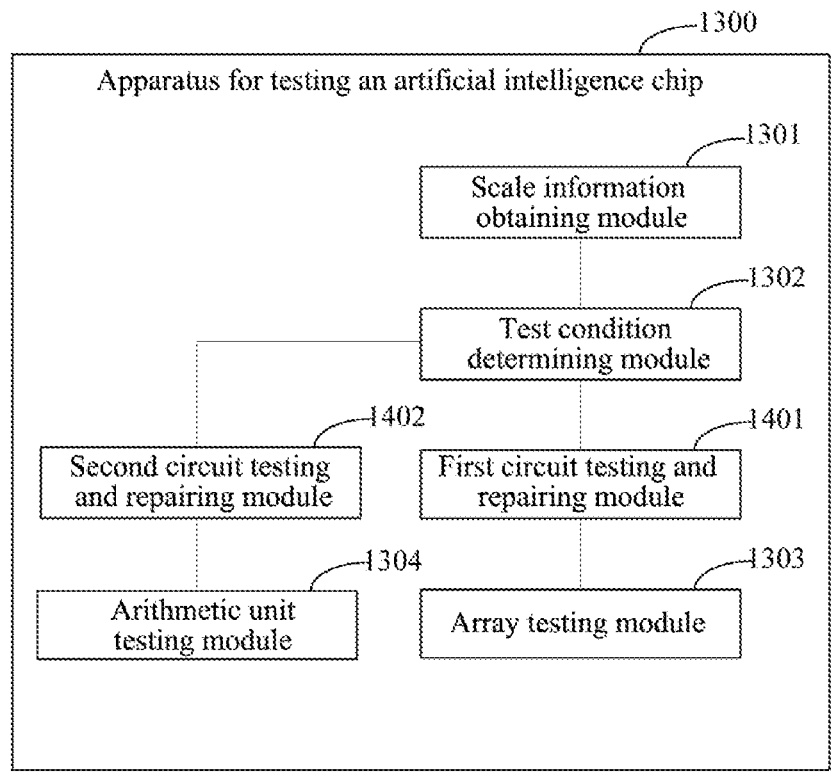
FIG. 14 is a schematic structural diagram of an apparatus for testing an artificial intelligence chip according to a fourth embodiment of the present disclosure.

FIG. 14 is a schematic structural diagram of an apparatus for testing an artificial intelligence chip according to the fourth embodiment of the present disclosure. As shown in FIG. 14, the apparatus 1400 for testing an artificial intelligence chip provided in this embodiment, based on the apparatus 1300 for testing an artificial intelligence chip provided in the third embodiment of the present disclosure, further includes: a first circuit testing and repairing module 1401 and a second circuit testing and repairing module 1402.

Further, the scale information includes a number of transistors in an arithmetic unit.

The test condition determining module 1302 is specifically configured to:

determine whether the number of the transistors is smaller than a preset scale threshold; determine the test condition of the arithmetic unit array level is satisfied, if it is determined that the number of the transistors is less than the preset scale threshold; determine the test condition of the arithmetic unit array level is not satisfied, if it is determined that the number of the transistors is greater than or equal to the preset scale threshold.

Further, the array testing module 1303, when dividing all arithmetic units into multiple same arithmetic unit arrays, is specifically configured to:

determine a number of arithmetic units in an arithmetic unit array according to the number of the transistors and the total number of the arithmetic units; divide all the arithmetic units into the multiple same arithmetic unit arrays, according to the number of the arithmetic units.

Further, each arithmetic unit array is provided with a first test logic circuit.

When performing the DFT test on the arithmetic unit arrays, respectively, the array testing module 1303 is specifically configured to:

generate first test vectors corresponding to the arithmetic unit arrays, where the first test vectors corresponding to respective ones of the arithmetic unit arrays are the same; perform the DFT test on the arithmetic unit arrays, respectively, by inputting the first test vectors into first test logic circuits corresponding to respective ones of the arithmetic unit arrays, respectively; output test results corresponding to respective ones of the arithmetic unit arrays.

Further, the first test logic circuit includes: a first test interface.

When performing the DFT test on the arithmetic unit arrays, respectively, by inputting the first test vectors into the first test logic circuits corresponding to respective ones of the arithmetic unit arrays, respectively, the array testing module 1303 is specifically configured to:

perform, through respective first test interfaces, the DFT test on the arithmetic unit arrays in parallel by broadcasting the first test vectors to the first test logic circuits of corresponding arithmetic unit arrays.

Further, each arithmetic unit is provided with a second test logic circuit.

When performing the DFT test on the arithmetic units, respectively, the arithmetic unit testing module 1304 is specifically configured to:

generate second test vectors corresponding to the arithmetic units, where the second test vector corresponding to respective ones of the arithmetic units are the same; perform the DFT test on the arithmetic units, respectively, by inputting the second test vectors into the second test logic circuits corresponding to respective ones of the arithmetic units, respectively; outputting test results corresponding to respective ones of the arithmetic units.

Further, the second test logic circuit includes: a second test interface.

When performing the DFT test on the arithmetic units, respectively, by inputting the second test vectors into the second test logic circuits corresponding to respective ones of the arithmetic units respectively, the arithmetic unit testing module 1304 is specifically configured to:

perform the DFT test on the arithmetic units in parallel by broadcasting, through respective second test interfaces, the second test vectors to the second test logic circuits of corresponding arithmetic units.

Further, the first circuit testing and repairing module 1401 is configured to perform a test on at least one first preset DFT logic circuit in the first test logic circuit at an RTL stage of the target artificial intelligence chip; and repair the first preset DFT logic circuit at the RTL stage of the target artificial intelligence chip, if the first preset DFT logic circuit fails the test.

Further, the second circuit testing and repairing module 1402 is configured to perform a test on at least one second preset DFT logic circuit in the second test logic circuit at the RTL stage of the target artificial intelligence chip; and repair the second preset DFT logic circuit at the RTL stage of the target artificial intelligence chip, if the second preset DFT logic circuit fails the test.

The apparatus for testing an artificial intelligence chip provided in this embodiment can execute the technical solution of the method embodiment shown in FIG. 4-FIG. 5, FIG. 7, FIG. 10, and its implementation principle and technical effects are similar to the method embodiment shown in FIG. 4-FIG. 5, FIG. 7, FIG. 10, and details are not repeated herein.

According to an embodiment of the present disclosure, the present disclosure further provides an electronic device and a readable storage medium.

Figure 15:
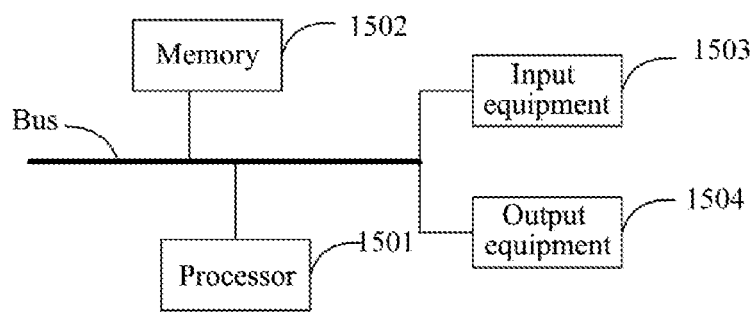
FIG. 15 is a block diagram of an electronic device for implementing the method for testing an artificial intelligence chip according to an embodiment of the present disclosure.

As shown in FIG. 15, it is a block diagram of an electronic device according to the method for testing an artificial intelligence chip according to an embodiment of the present disclosure. The electronic device is intended to be various forms of digital computers, such as a laptop computer, a desktop computer, a workstation, a test machine, a personal digital assistant, a server, a blade server, a mainframe computer, and other suitable computers. The electronic device can also represent various forms of mobile devices, such as a personal digital assistant, a cellular phone, a smart phone, a wearable device, and other similar computing devices. The components shown herein, their connections and relationships, and their functions are merely illustrative, and are not intended to limit the implementation of the disclosure described and/or claimed herein.

As shown in FIG. 15, the electronic device includes: one or more processors 1501, a memory 1502, and interfaces for connecting various components, including a high-speed interface and a low-speed interface. The various components are connected to each other using different buses and can be installed on a common motherboard or in other ways as needed. The processor may process instructions executed within the electronic device, including instructions stored in or on the memory to display graphical information of a GUI on an external input/output equipment, such as a display device coupled to the interface. In other embodiments, multiple processors and/or multiple buses may be used with multiple memories if desired. Similarly, multiple electronic devices can be connected, and each device provides some necessary operations (for example, as a server array, a group of blade servers, or a multi-processor system). In FIG. 15, one processor 1501 is taken as an example.

The memory 1502 is a non-transitory computer-readable storage medium provided by this disclosure. The memory stores instructions executable by at least one processor, so that the at least one processor executes the method for testing an artificial intelligence chip provided by the present disclosure. The non-transitory computer-readable storage medium of the present disclosure stores computer instructions for causing the computer to execute the method for testing an artificial intelligence chip provided by the present disclosure.

The memory 1502, as a non-transitory computer-readable storage medium, can be used to store non-transitory software programs, non-transitory computer executable programs and modules, such as program instructions/modules corresponding to the method for testing an artificial intelligence chip in the embodiments of the present disclosure (e.g. the scale information obtaining module 1301, the test condition determining module 1302, the array testing module 1303, the arithmetic unit testing module 1304 shown in FIG. 13). The processor 1501 executes various functional disclosures and data processing of the server by running non-transitory software programs, instructions and modules stored in the memory 1502, that is, implementing the method for testing an artificial intelligence chip in the foregoing method embodiments.

The memory 1502 may include a program storage area and a data storage area, where the program storage area may store an operating system and disclosure programs required by at least one function and the data storage area may store data created according to the use of the electronic device of FIG. 15 and the like. In addition, the memory 1502 may include a high-speed random access memory, and may also include a non-transitory memory, such as at least one magnetic disk storage device, a flash memory device, or other non-transitory solid-state storage devices. In some embodiments, the memory 1502 may optionally include memories remotely provided with respect to the processor 1501, and these remote memories may be connected to the electronic device of FIG. 15 through a network. Examples of the above network include but are not limited to the Internet, an intranet, a local area network, a mobile communication network, and a combination thereof.

The electronic device of FIG. 15 may further include: an input equipment 1503 and an output equipment 1504. The processor 1501, the memory 1502, the input equipment 1503, and the output equipment 1504 may be connected by a bus or other means. In FIG. 15, the connection by a bus is used as an example.

The input equipment 1503, such as a touch screen, a keypad, a mouse, a track pad, a touch pad, a pointing stick, one or more mouse buttons, a trackball, a joystick and other input equipment, can receive input voice, numeric or character information, and generate a key signal input related to user setting and function control of the electronic device of FIG. 15. The output equipment 1504 may include a voice playback device, a display device, an auxiliary lighting apparatus (for example, LED), a tactile feedback apparatus (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and techniques described herein may be implemented in a digital electronic circuitry, an integrated circuit system, a dedicated ASIC (disclosure specific integrated circuit), computer hardware, firmware, software, and/or a combination thereof. These various implementations may include: to implement in one or more computer programs that can be executed and/or interpreted on a programmable system that includes at least one programmable processor, where the programmable processor can be a dedicated or general-purpose programmable processor, and can receive data and instructions from a storage system, at least one input equipment, and at least one output equipment, and send data and instructions to the storage system, the at least one input equipment, and the at least one output equipment.

These computing programs (also called programs, software, software disclosures, or codes) include machine instructions of the programmable processor, and can be implemented using a high-level process and/or an object-oriented programming language, and/or an assembly/machine language. As used herein, the terms "machine-readable medium" and "computer-readable medium" refer to any computer program product, device, and/or apparatus (for example, magnetic disks, optical disks, memory, programmable logic devices (PLD)) used to provide machine instructions and/or data to a programmable processor, including a machine-readable medium that receives the machine instructions as machine-readable signals. The term "machine-readable signal" refers to any signal used to provide machine instructions and/or data to a programmable processor.

In order to provide interaction with the user, the systems and techniques described herein can be implemented on a computer having display apparatus for displaying information to the user (for example, CRT (Cathode Ray Tube) or LCD (Liquid Crystal Display) monitor), and keyboard and pointing apparatus (for example, mouse or trackball), which the user can use to provide input to the computer. Other kinds of devices can also be used to provide interaction with users. For example, a feedback provided to the user may be any form of sensory feedback (for example, visual feedback, auditory feedback, or tactile feedback), and an input can be received from the user in any form (including sound input, voice input, or tactile input).

The systems and techniques described herein may be implemented in a computing system that includes a back-end component (e.g., as a data server), or a computing system that includes a middleware component (e.g., an disclosure server), or a computing system that includes a front-end component (e.g., a user computer with a graphical user interface or a web browser, through which the user can interact with the implementation of the systems and technologies described herein), or a computing system includes any combination of such background component, middleware component, or front-end component. The components of the system can be interconnected by any form or medium of digital data communication (e.g., a communication network). Examples of the communication network includes: a local area network (LAN), a wide area network (WAN) and the Internet.

The computer system may include a client and a server. The client and the server are generally far from each other and usually interact through a communication network. The relationship of the client and the server is generated by computer programs that run on corresponding computers and have a client-server relationship with each other.

According to the technical solutions of the embodiments of the present disclosure, since the same arithmetic unit arrays or arithmetic units of the artificial intelligence chip are tested respectively, the test logic circuit and the test vector of each arithmetic unit array or arithmetic unit are completely the same. So the test cost is reduced. In addition, the number of the transistors in each arithmetic unit or arithmetic unit array is very small, so that the scale of the test vector is also small, and thus the test time is greatly reduced and the test efficiency is improved. In addition, loading the DFT of each arithmetic unit or arithmetic unit array will require far less computing and storing resources of the memory, which greatly reduces the test power consumption.

It should be understood that the various forms of processes shown above can be used to reorder, add, or delete steps. For example, the steps described in the present disclosure may be performed in parallel, sequentially, or in different orders. As long as the desired results of the technical solutions disclosed in the present disclosure can be achieved, no limitation is made herein.

The above specific embodiments do not constitute a limitation on the protection scope of the present disclosure. Those skilled in the art should understand that various modifications, combinations, sub-combinations and substitutions can be made according to design requirements and other factors. Any modification, equivalent replacement and improvement made within the spirit and principle of this disclosure shall be included in the protection scope of this disclosure.

What is claimed is:

1. A method for testing an artificial intelligence chip, wherein a target artificial intelligence chip has multiple same arithmetic units, and the method comprises:
obtaining scale information of the target artificial intelligence chip;
determining whether the target artificial intelligence chip satisfies a test condition of an arithmetic unit array level according to the scale information;
dividing all the arithmetic units into multiple same arithmetic unit arrays, and performing a Design for Test (DFT) test on the arithmetic unit arrays, respectively, upon determining that the test condition of the arithmetic unit array level is satisfied, wherein the performing the DFT test on the arithmetic unit arrays comprises performing, at the arithmetic unit array level, the DFT test on each of the arithmetic unit arrays;
performing the DFT test on the arithmetic units, respectively, upon determining that the test condition of the arithmetic unit array level is not satisfied, wherein the performing the DFT test on the arithmetic units comprises performing, at an arithmetic unit level, the DFT test on each of the arithmetic units;
wherein the scale information comprises a number of transistors in an arithmetic unit, and the determining whether the target artificial intelligence chip satisfies a test condition of an arithmetic unit array level according to the scale information, comprises:
determining whether the number of the transistors is smaller than a preset scale threshold;
determining that the test condition of the arithmetic unit array level is satisfied, upon determining that the number of the transistors is less than the preset scale threshold;
determining that the test condition of the arithmetic unit array level is not satisfied, upon determining that the number of the transistors is greater than or equal to the preset scale threshold.

2. The method according to claim 1, wherein the dividing all the arithmetic units into multiple same arithmetic unit arrays, comprises:
determining a number of arithmetic units in an arithmetic unit array according to the number of the transistors and a total number of the arithmetic units;
dividing all the arithmetic units into the multiple same arithmetic unit arrays, according to the number of the arithmetic units.

3. The method according to claim 1, wherein each of the arithmetic unit arrays is provided with a first test logic circuit;
the performing a DFT test on the arithmetic unit arrays, respectively, comprises:
generating first test vectors corresponding to the arithmetic unit arrays, wherein the first test vectors corresponding to respective ones of the arithmetic unit arrays are the same;
performing the DFT test on the arithmetic unit arrays, respectively, by inputting the first test vectors into first test logic circuits corresponding to respective ones of the arithmetic unit arrays, respectively;
outputting test results corresponding to respective ones of the arithmetic unit arrays.

4. The method according to claim 3, wherein the first test logic circuit comprises: a first test interface;
the performing the DFT test on the arithmetic unit arrays, respectively, by inputting the first test vectors into first test logic circuits corresponding to respective ones of the arithmetic unit arrays, respectively, comprises:
performing the DFT test on the arithmetic unit arrays in parallel by broadcasting, through respective first test interfaces, the first test vectors to the first test logic circuits of corresponding arithmetic unit arrays.

5. The method according to claim 1, wherein each of the arithmetic units is provided with a second test logic circuit;
the performing the DFT test on the arithmetic units, respectively, comprises:
generating second test vectors corresponding to the arithmetic units, wherein the second test vectors corresponding to respective ones of the arithmetic units are the same;
performing the DFT test on the arithmetic units, respectively, by inputting the second test vectors into second test logic circuits corresponding to respective ones of the arithmetic units, respectively;
outputting test results corresponding to respective ones of the arithmetic units.

6. The method according to claim 5, wherein the second test logic circuit comprises: a second test interface;
the performing the DFT test on the arithmetic units, respectively, by inputting the second test vectors into second test logic circuits corresponding to respective ones of the arithmetic units, respectively, comprises:

performing the DFT test on the arithmetic units in parallel by broadcasting, through respective second test interfaces, the second test vectors to the second test logic circuits of corresponding arithmetic units.

7. The method according to claim 3, wherein before the performing the DFT test on the arithmetic unit arrays, respectively, the method further comprises:
   performing a test on at least one first preset DFT logic circuit in the first test logic circuit at a register-transfer level (RTL) stage of the target artificial intelligence chip;
   repairing the first preset DFT logic circuit at the RTL stage of the target artificial intelligence chip, when the first preset DFT logic circuit fails the test.

8. The method according to claim 5, wherein before the performing the DFT test on the arithmetic units, respectively, the method further comprises:
   performing a test on at least one second preset DFT logic circuit in the second test logic circuit at an RTL stage of the target artificial intelligence chip;
   repairing the second preset DFT logic circuit at the RTL stage of the target artificial intelligence chip, when the second preset DFT logic circuit fails the test.

9. An electronic device, comprising:
   at least one processor; and
   a memory communicatively connected to the at least one processor; wherein, the memory stores instructions executable by the at least one processor, and the at least one processor when executing the instructions is configured to:
   obtain scale information of a target artificial intelligence chip;
   determine whether the target artificial intelligence chip satisfies a test condition of an arithmetic unit array level according to the scale information;
   divide all the arithmetic units into multiple same arithmetic unit arrays, and perform a Design for Test (DFT) test on the arithmetic unit arrays, respectively, upon determining that the test condition of the arithmetic unit array level is satisfied, wherein the performing the DFT test on the arithmetic unit arrays comprises performing, at the arithmetic unit array level, the DFT test on each of the arithmetic unit arrays;
   perform the DFT test on the arithmetic units, respectively, upon determining that the test condition of the arithmetic unit array level is not satisfied, wherein the performing the DFT test on the arithmetic units comprises performing, at an arithmetic unit level, the DFT test on each of the arithmetic units;
   wherein the scale information comprises a number of transistors in an arithmetic unit, and the at least one processor is further configured to:
   determine whether the number of the transistors is smaller than a preset scale threshold;
   determine the test condition of the arithmetic unit array level is satisfied, upon determining that the number of the transistors is less than the preset scale threshold;
   determine the test condition of the arithmetic unit array level is not satisfied, upon determining that the number of the transistors is greater than or equal to the preset scale threshold.

10. The electronic device according to claim 9, wherein when dividing all the arithmetic units into multiple same arithmetic unit arrays, the at least one processor is configured to:
   determine a number of arithmetic units in an arithmetic unit array according to the number of the transistors and a total number of the arithmetic units; and divide all the arithmetic units into the multiple same arithmetic unit arrays, according to the number of the arithmetic units.

11. The electronic device according to claim 9, wherein each of the arithmetic unit arrays is provided with a first test logic circuit; and
   when performing the DFT test on the arithmetic unit arrays, respectively, the at least one processor is configured to:
   generate first test vectors corresponding to the arithmetic unit arrays, wherein the first test vectors corresponding to respective ones of the arithmetic unit arrays are the same; perform the DFT test on the arithmetic unit arrays, respectively, by inputting the first test vectors into first test logic circuits corresponding to respective ones of the arithmetic unit arrays, respectively; output test results corresponding to respective ones of the arithmetic unit arrays.

12. The electronic device according to claim 11, wherein the first test logic circuit comprises: a first test interface; and
   when performing the DFT test on the arithmetic unit arrays, respectively, by inputting the first test vectors into the first test logic circuits corresponding to respective ones of the arithmetic unit arrays, respectively, the at least one processor is configured to:
   perform the DFT test on the arithmetic unit arrays in parallel by broadcasting, through respective first test interfaces, the first test vectors to the first test logic circuits of corresponding arithmetic unit arrays.

13. The electronic device according to claim 9, wherein each of the arithmetic units is provided with a second test logic circuit; and
   when performing the DFT test on the arithmetic units, respectively, the at least one processor is configured to:
   generate second test vectors corresponding to the arithmetic units, wherein the second test vectors corresponding to respective ones of the arithmetic units are the same; perform the DFT test on the arithmetic units, respectively, by inputting the second test vectors into second test logic circuits corresponding to respective ones of the arithmetic units, respectively; and output test results corresponding to respective ones of the arithmetic units.

14. The electronic device according to claim 13, wherein the second test logic circuit comprises: a second test interface;
   when performing the DFT test on the arithmetic units, respectively, by inputting the second test vectors into second test logic circuits corresponding to respective ones of the arithmetic units, respectively, the at least one processor is configured to:
   perform the DFT test on the arithmetic units in parallel by broadcasting, through respective second test interfaces, the second test vectors to the second test logic circuits of corresponding arithmetic units.

15. The electronic device according to claim 11, wherein before the performing the DFT test on the arithmetic unit arrays, respectively, the at least one processor is further configured to:
   perform a test on at least one first preset DFT logic circuit in the first test logic circuit at a register-transfer level (RTL) stage of the target artificial intelligence chip; and
   repair the first preset DFT logic circuit at the RTL stage of the target artificial intelligence chip, when the first preset DFT logic circuit fails the test.

16. The electronic device according to claim 13, wherein before the performing the DFT test on the arithmetic units, respectively, the at least one processor is further configured to:
  perform a test on at least one second preset DFT logic circuit in the second test logic circuit at an RTL stage of the target artificial intelligence chip; and repair the second preset DFT logic circuit at the RTL stage of the target artificial intelligence chip, when the second preset DFT logic circuit fails the test.

17. A non-transitory computer-readable storage medium having computer instructions stored thereon, wherein the computer instructions are used to cause a computer to perform a method comprising:
  obtaining scale information of a target artificial intelligence chip;
  determining whether the target artificial intelligence chip satisfies a test condition of an arithmetic unit array level according to the scale information;
  dividing all the arithmetic units into multiple same arithmetic unit arrays, and performing a Design for Test (DFT) test on the arithmetic unit arrays, respectively, upon determining that the test condition of the arithmetic unit array level is satisfied, wherein the performing the DFT test on the arithmetic unit arrays comprises performing, at the arithmetic unit array level, the DFT test on each of the arithmetic unit arrays;
  performing the DFT test on the arithmetic units, respectively, upon determining that the test condition of the arithmetic unit array level is not satisfied, wherein the performing the DFT test on the arithmetic units comprises performing, at an arithmetic unit level, the DFT test on each of the arithmetic units;
  wherein the scale information comprises a number of transistors in an arithmetic unit, and the determining whether the target artificial intelligence chip satisfies a test condition of an arithmetic unit array level according to the scale information, comprises:
  determining whether the number of the transistors is smaller than a preset scale threshold;
  determining the test condition of the arithmetic unit array level is satisfied, upon determining that the number of the transistors is less than the preset scale threshold;
  determining the test condition of the arithmetic unit array level is not satisfied, upon determining that the number of the transistors is greater than or equal to the preset scale threshold.

* * * * *